UNITED STATES PATENT OFFICE.

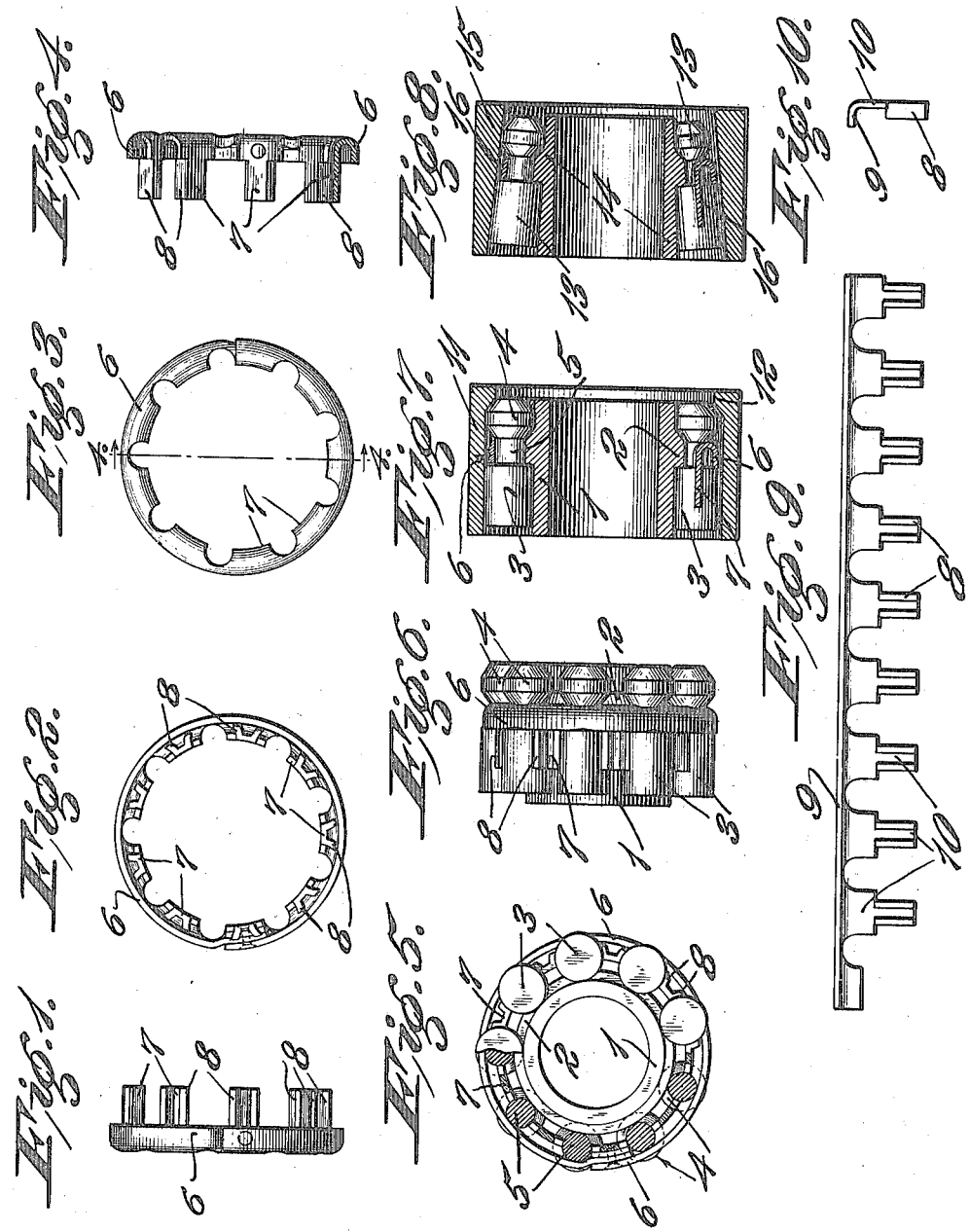

ONESIME E. MICHAUD, OF ST. LOUIS, MISSOURI.

ROLLER-BEARING.

1,220,765.

Specification of Letters Patent.   Patented Mar. 27, 1917.

Application filed January 14, 1916. Serial No. 72,033.

*To all whom it may concern:*

Be it known that I, ONESIME E. MICHAUD, a citizen of the United States, and a resident of the city of St. Louis and State of Missouri, have invented a new and useful Improvement in Roller-Bearings, of which the following is a specification.

This invention relates to antifriction bearings of the type wherein a series of cylindrical or conical rollers are spaced circumferentially between inner and outer concentric bearing rings. The invention relates to the shape and arrangement of the parts of the bearing, and particularly to an improved cage or retaining member for retaining bearing rollers having necks of reduced diameter between their ends in circular alinement at fixed distances apart.

The objects of the invention are to reduce the space required for the bearing, to maintain the bearing rollers in alinement without cramping or binding them, and to simplify the construction and cheapen the cost of the bearing. Further objects of the invention relate to improvements in the materials and in the construction of antifriction bearings and retaining members therefor, said improvements being more fully pointed out hereinafter.

Generally stated, the invention consists in the combination of cylindrical or conical rollers, which are circumferentially grooved to form a head at one end of each, and a roller raceway or bearing ring having a flange around it which fits in the grooves under the necks of the rollers, with a retainer for holding the rollers in spaced parallel relation around the bearing ring. The invention also consists in the shape and construction of the retainer, which is made of sheet metal having a band for encircling the necks of the rollers and holding them in place upon the inner bearing ring, said band having spacing members integral therewith which are arranged in the grooves and spaces between the rollers to hold them in alinement. The invention further consists in the parts, and in the arrangements and combinations of parts, more fully set forth hereinafter.

In the accompanying drawings in which like reference characters refer to like parts in the several views, Figure 1 is a side view of a retaining member for roller bearings embodying the invention;

Fig. 2 is an end view of the retaining member shown in Fig. 1, looking toward its flanged end;

Fig. 3 is a view of the end of the retaining member opposite to the end shown in Fig. 2;

Fig. 4 is a diametrical section of the retaining member on the line 4—4 in Fig. 3;

Fig. 5 is an end view, partly in section, of the bearing rings, bearing rollers and retaining member assembled;

Fig. 6 is a side view of the inner bearing ring, bearing rollers and retaining members assembled;

Fig. 7 is a diametrical section through the bearing rings, bearing rollers and retaining member assembled;

Fig. 8 is a section similar to Fig. 7 showing a retaining member for tapered bearing rollers;

Fig. 9 is a view of the blank from which the retaining member is made, showing it after the stamping operation which forms the wings; and Fig. 10 is an end view of the same.

Referring to the accompanying drawings, the inner bearing ring 1 of the roller bearing has an exterior circumferential ridge 2, one edge of which is beveled. Each of the bearing rollers comprises a cylindrical portion 3 and a head 4 connected by a neck 5 of reduced diameter. The inner circumferential edge of the head 4 of each bearing roller is beveled to coöperate with the beveled edge of the ridge 2 of the inner bearing ring 1. The outer circumferential edge of the head 4 of each bearing roller is also beveled to coöperate with a beveled face of an outer bearing ring (see Figs. 7 and 8).

The retaining member, shown in Figs. 1 to 7, comprises a circular band 6 from one edge of which projects a plurality of tongues 7 forming spacing members for holding the bearing rollers in alinement. These tongues or spacing members 7 are located at equal intervals throughout the length of the band 6, corresponding to the size and the spacing of the bearing rollers. Each spacing member 7 extends radially inward from the outer edge of the band 6, and then crosswise under said band parallel to the axis of the bearing. The free end portions of the spacing members 7 project from under the band 6, and are narrower than the intermediate portions. As much of the end portion of each spacing member 7 as is not under the band 6 has lateral wings 8 formed integral therewith, one of said wings projecting outward from each longitudinal edge of said spacing member. The wings 8 are concave on their outer faces, substantially conforming to the shape of the cylindrical portions of the rollers.

The retaining member is preferably made from a single piece of sheet metal by simple operations of stamping and bending. The piece of sheet metal is first stamped into a blank (see Fig. 9) which comprises a strip 9, corresponding to the band 6 of the finished retaining member. Integral with the strip 9 of the blank are equally spaced tongues 10 which project from one edge of said strip 9 at right angles. The tongues 10 correspond to the spacing members 7 of the finished retaining member and have their outer ends slit in on opposite sides at points corresponding to the inner ends of the wings 8 of the finished retaining member. The continuous edge or strip 9 of the blank stands up at right angles to the tongues 10, and the side edges of the tongues for the outer half of their length are bent up to form wings 8, as shown in Figs. 9 and 10. The blank is then bent into ring shape, the ends being brought together and lapped, and the tongues are bent parallel to the band, as shown in Figs. 1, 2 and 3. The ring thus formed may have either a cylindrical or conical form, depending on the type of the bearing with which the retaining member is to be used. The semi-circular ends of the slots between the tongues are reamed true in a jig, and the concave faces of the wings are reamed true and in alinement therewith at the same time. The lapping end portions of the strip 9, which are the end portions of the band 6 of the finished retaining member, are punched for a rivet or other securing means, and one end portion is flattened and offset sidewise to fit within the other end to keep the two faces of the band smooth (see Figs. 2 and 3).

In assembling the retaining member and the bearing rollers on the inner bearing ring, the bearing rollers are fitted into the spaces between the spacing members 7 of the retaining member, the cylindrical bearing portions 3 of said bearing rollers fitting between the wings 8 of said spacing members, and the necks of the rollers bearing against the intermediate portions of the spacing members 7 and the inner face of the band 6 of said retaining member. The inner bearing ring 1 is forced into place inside of the bearing rollers, the retaining member being resilient and expanding sufficiently to permit the heads 4 of the bearing rollers to pass over the ridge 2 of the inner bearing ring 1. The overlapped end portions of the band 6 are suitably secured together to retain the rollers on the inner bearing ring, preferably by a rivet or by an indentation punched from one end portion into the other (see Figs. 1 and 5). The band of the retaining member encircles the bearing rollers and positively prevents them from moving outwardly from the inner bearing ring, and the cylindrical portions 3 and the heads 4 of the bearing rollers straddle the ridge 2 of the inner bearing ring 1 and prevent the rollers from slipping endwise. The band and intermediate portions of the spacing members encircle closely the necks 5 of the bearing rollers, and the retaining member is thereby held against movement lengthwise of the rollers. The outer bearing ring 11 can be slipped into place endwise over the rollers until the beveled inner face of the flange 12 brings up against the outer beveled edges of the heads 4.

After the parts have been assembled, the curved wing portions of the spacing members are located at the same distance from the center of the inner bearing ring as the axis of the bearing rollers, so that the bearing rollers are guided circumferentially by the spacing members substantially in line with the direction of movement of the axes of said rollers. The spacing members 7 engage the cylindrical portions 3 and the necks 5 of the bearing rollers and hold said bearing rollers in parallel alinement, and the beveled faces of the ridge 3 and flange 11 resist endwise movement of the rollers with respect to the bearing rings, and thereby transmit axial pressure or side thrust on one bearing ring to the other bearing ring. The short length of the heads 4 reduces the tendency of this axial pressure to twist the bearing rollers out of parallel alinement.

The same advantages appertain to the construction shown in Fig. 8, wherein the bearing rollers 13 are tapered, and the inner bearing ring 14 and outer bearing ring 15 have conical bearing surfaces to conform to the taper of the rollers. The retaining ring 16 has a conical band portion fitting over the converging necks of the rollers, and spacing members which converge to conform to the spaces between the tapered rollers.

The retaining member can be made from a single piece of sheet metal by simple punching and bending operations with sufficient accuracy for most purposes. A very high degree of accuracy of the guiding faces can be attained by reaming after bending, as above described.

The construction shown and hereinbefore described may be considerably changed without departing from the invention and I do not wish to be restricted to the details of the construction shown and described.

I claim the following as my invention:

1. In a roller bearing, the combination of an inner bearing ring having an exterior circumferential ridge, bearing rollers coöperating with the exterior surface of said bearing ring, each of said bearing rollers having a neck of reduced diameter between its ends positioned over said ridge, and a retaining member of sheet metal for holding said bearing rollers in alinement on said bearing ring, said retaining member comprising a band encircling said bearing rollers outside of the necks thereof, said band having integral therewith a plurality of spacing members doubled under said band and arranged between said bearing rollers, the spacing members being shaped to embrace the outer sides of the necks of the rollers.

2. In a roller bearing, the combination of an inner bearing ring having an exterior circumferential ridge, bearing rollers coöperating with the exterior surface of said bearing ring, each of said bearing rollers having a neck of reduced diameter between its ends positioned over said ridge, and a retaining member of sheet metal for holding said bearing rollers in alinement on said bearing ring, said retaining member comprising a band encircling said bearing rollers outside of the necks thereof, said band having a plurality of tongues doubled under it and arranged between said bearing rollers to form spacing members for them, said spacing members engaging the necks of the rollers and fitting in the spaces between them.

3. In a roller bearing, the combination of an inner bearing ring having an exterior circumferential ridge, bearing rollers coöperating with the exterior surface of said bearing ring, each of said bearing rollers having a neck of reduced diameter between its ends positioned over said ridge, and a retaining member of sheet metal for holding said bearing rollers in alinement on said bearing ring, said retaining member comprising a band encircling said bearing rollers outside of the necks thereof, said band having a plurality of tongues doubled under it and arranged between said bearing rollers to form spacing members for them, said spacing members engaging the necks of the rollers, the free ends of said spacing members having wings conforming to the shape of the sides of the rollers and positioned substantially the same distance from the center of said bearing ring as the path of movement of the axes of said bearing rollers.

4. In a roller bearing, the combination of an inner bearing ring having an exterior circumferential ridge, of bearing rollers coöperating with the exterior surface of said bearing ring, each of said bearing rollers having a neck of reduced diameter between its ends positioned over said ridge of said bearing ring, and a retaining member of sheet metal for holding said bearing rollers in alinement on said bearing ring, said retaining member comprising a circular band encircling said bearing rollers on the outside of the necks thereof, said band having a plurality of spacing members integral therewith doubled under it, the free ends of said spacing members lying in the spaces between adjacent rollers and having integral lateral wings forming pockets for the rollers, the intermediate portions of adjacent spacing members partly encircling the necks of said rollers.

5. In a roller bearing, the combination of an inner bearing ring having an exterior circumferential ridge, bearing rollers coöperating with the exterior surface of said bearing ring, each of said bearing rollers having a neck of reduced diameter between its ends positioned over said ridge, and a retaining member for retaining said bearing rollers in alinement on said bearing ring, said retaining member comprising a circular band encircling said bearing rollers on the outside of the necks thereof, a plurality of spacing members projecting inward from one edge of said band and having portions of their length bent parallel to the band and arranged in a circular series inside of it, the edges of said portions of adjacent spacing members embracing the neck of the bearing roller arranged between them.

6. In a roller bearing, the combination of bearing rollers having necks of reduced diameter between their ends and an integral retaining member of sheet metal comprising a circular band encircling said bearing rollers on the outside of the necks thereof, and spacing members arranged in a circular series inside of said band and spaced therefrom, the free ends of said spacing members fitting between said bearing rollers and holding them in alinement, and the intermediate portions of said spacing members connecting them with said band fitting in the spaces between the necks of said bearing rollers.

7. A retaining member for roller bearings comprising a circular band and a plurality of spacing members integral with one edge of said band, portions of said spacing members remote from said edge being arranged in a circular series extending inside of the other edge of said band, the intermediate portions of said spacing members connecting the band and the remote portions being wider than said remote portions.

8. A retaining member for roller bearings in the form of an annular shell made of a strip of sheet metal, said shell consisting of a circularly formed band and a series of spacing members integral with said band, said band encircling said series of spacing members, the intermediate portions of said spacing members which connect the end portions to said band approaching each other at their junctions with said band to form semi-circular notches between them, and the ends of said band being detachably secured together.

9. A retaining member of sheet metal for holding grooved bearing rollers in alinement, said retaining member comprising a band for encircling said bearing rollers outside of the necks thereof, said band having a plurality of tongues doubled under it and arranged to form spacing members for engaging the necks of the rollers and fitting in the spaces between them.

10. A retaining member for roller bearings comprising a circular band and a plurality of spacing members integral at one end with said band, portions of said spacing members being arranged in a circular series inside of the band and having lateral wings integral therewith, and intermediate portions of said spacing members connecting said band and wing portions, said intermediate portions being wider than said inner portions and bent at their inner ends to partly encircle bearing rollers.

11. A retaining member for roller bearings comprising a circular band and a plurality of spacing members integral at one end with said band, portions of said spacing members being arranged inside of said band and spaced therefrom, and intermediate portions of said spacing members connecting said band and inner portions, said intermediate portions being wider than said inner portions.

12. A retaining member for roller bearings comprising a strip of sheet metal having one longitudinal edge portion thereof continuous and a plurality of parallel tongues forming spacing members integral with said edge portion, said spacing members having outwardly curved wings integral therewith springing from their side edges adjacent to their free ends, the spaces between the intermediate portions of said spacing members connecting said band and winged portions being semicircular at their inner ends, said strip being bent double along longitudinal lines intersecting and bordering the semicircular ends of said spaces and being curved along transverse lines into an annular form.

Signed at St. Louis, Missouri, this 3rd day of January, 1915.

ONESIME E. MICHAUD.